United States Patent
Lu et al.

(10) Patent No.: US 9,639,209 B2
(45) Date of Patent: May 2, 2017

(54) OPTICAL TOUCH SYSTEM AND TOUCH DISPLAY SYSTEM

(71) Applicant: Wistron Corporation, New Taipei (TW)

(72) Inventors: Kou-Hsien Lu, New Taipei (TW); Yu-Yen Chen, New Taipei (TW); Po-Liang Huang, New Taipei (TW); Chia-Jui Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 124 days.

(21) Appl. No.: 14/070,592

(22) Filed: Nov. 4, 2013

(65) Prior Publication Data
US 2015/0042618 A1    Feb. 12, 2015

(30) Foreign Application Priority Data
Aug. 6, 2013    (TW) .............................. 102128097 A (51) Int. Cl.
*G06F 3/042*    (2006.01)
*G06F 3/041*    (2006.01)

(52) U.S. Cl.
CPC .......... *G06F 3/0421* (2013.01); *G06F 3/0416* (2013.01); *G06F 3/0418* (2013.01)

(58) Field of Classification Search
CPC .............................. G06F 3/0421; G06F 3/0425
USPC ....................................................... 345/175
See application file for complete search history.

(56) References Cited

U.S. PATENT DOCUMENTS

| | | | |
|---|---|---|---|
| 2010/0321309 A1* | 12/2010 | Lee et al. ....................... | 345/173 |
| 2012/0327031 A1* | 12/2012 | Fujioka ......................... | 345/175 |
| 2013/0038577 A1* | 2/2013 | Chen et al. .................... | 345/175 |
| 2013/0141389 A1* | 6/2013 | Chou et al. .................... | 345/175 |
| 2013/0249865 A1* | 9/2013 | Liu ........................ | G06F 3/0428 |
| | | | 345/175 |
| 2014/0232697 A1* | 8/2014 | Lin et al. ....................... | 345/175 |
| 2014/0267174 A1* | 9/2014 | Lin et al. ....................... | 345/175 |

OTHER PUBLICATIONS

Office action mailed/issued on Nov. 1, 2016 for CN application No. 201310361842.5, p. 3 line 4~45, p. 4~6 and p. 7 line 1~20.

* cited by examiner

*Primary Examiner* — Chanh Nguyen
*Assistant Examiner* — Daniel Duong
(74) *Attorney, Agent, or Firm* — Winston Hsu; Scott Margo (57) ABSTRACT

An optical touch system includes two optical sensing modules and a processing module. The optical sensing module includes a mounting base and a light sensing device. The mounting base has an alignment structure and is disposed at a corner of a touch area by aligning the alignment structure with the profile of the corner. The light sensing device is disposed on the mounting base toward the touch area. The processing module receives signals from the two optical sensing modules to generate coordinates relative to a touch performed on the touch area. A touch display system using the optical touch system further includes a displaying device. The processing module of the touch display system also controls the displaying device to display an image on a screen according to the coordinates; therein, the screen thereon defines the touch area.

15 Claims, 5 Drawing Sheets

OPTICAL TOUCH SYSTEM AND TOUCH DISPLAY SYSTEM

BACKGROUND OF THE INVENTION

1. Field of the Invention

The invention relates to an optical touch system and a touch display system using the optical touch system.

2. Description of the Prior Art

Some optical touch systems use light sensing devices disposed at the border of a touch area to capture touch signals relative to the touch area so as to determine the touch position of an object (e.g. a finger or touch pen). However, the disposition (including a relative position and a lens angle) of the light sensing device relative to the touch area may involve a variation due to the assembly of the light sensing device (e.g. assembled onto a liquid crystal display panel) or the system setup before use (e.g. for a projection displaying system), so before the usage of touch function, it is necessary to perform a calibration procedure so that the range of touch signals sensed by the light sensing devices can correctly correspond to the range of the touch area when the sensed touch signals are analyzed. The calibration procedure usually needs reference touches (e.g. at the four corners of the touch area) by a user. However, human actions will involve variation, so even after the calibration procedure, a little variation still exists in the corresponding relation of the range of the touch signals sensed by the light sensing devices to the range of the touch area. Furthermore, when several light sensing devices are used, relative distances among the light sensing devices are needed for determining more precise coordinates of a touch. For simplifying the analysis, the distances are set to be a fixed value. However, in projection displaying systems, the touch area thereof often varies on actual use situations (e.g. for different projection areas), leading to a difficulty in applying the above design of fixed distance.

SUMMARY OF THE INVENTION

An objective of the invention is to provide an optical touch system. By aligning structures of optical sensing modules of the optical touch with the profile of a touch area, a positioning of the optical sensing modules relative to the touch area can be directly obtained, so that the optical touch system can be ready for use without any further calibration.

The optical touch system of the invention is used for sensing a touch performed on a touch area. The optical touch system includes a first optical sensing module, a second optical sensing module, and a processing module. The first optical sensing module includes a first mounting base and a first light sensing device. The first mounting base has a first alignment structure. The first light sensing device is disposed on the first mounting base such that a relative position of the first light sensing device to the first mounting base is fixed. The first optical sensing module is disposed at a first corner of the touch area such that the first alignment structure is aligned with a profile of the first corner, and the first light sensing device faces the touch area. The first light sensing device is used for generating a first signal relative to the touch. The second optical sensing module includes a second mounting base and a second light sensing device. The second mounting base has a second alignment structure. The second light sensing device is dispose don the second mounting base such that a relative position of the second light sensing device to the second mounting base is fixed. The second optical sensing module is disposed at a second corner of the touch area such that the second alignment structure is aligned with a profile of the second corner, and the second light sensing device faces the touch area. The second light sensing device is used for generating a second signal relative to the touch. The processing module is connected in communication to the first light sensing device and the second light sensing device, for receiving the first signal and the second signal and generating coordinates relative to the touch according to the first signal and the second signal.

Another objective of the invention is to provide a touch display system using the optical touch system of the invention. The touch display system includes a displaying device, a first optical sensing module, a second optical sensing module, and a touch and display processing module. The displaying device is used for displaying an image on a screen. The screen thereon defines a touch area. The first optical sensing module includes a first mounting base and a first light sensing device. The first mounting base has a first alignment structure. The first light sensing device is disposed on the first mounting base such that a relative position of the first light sensing device to the first mounting base is fixed. The first optical sensing module is disposed at a first corner of the touch area such that the first alignment structure is aligned with a profile of the first corner, and the first light sensing device faces the touch area. The first light sensing device is used for generating a first signal relative to a touch performed on the touch area. The second optical sensing module includes a second mounting base and a second light sensing device. The second mounting base has a second alignment structure. The second light sensing device is dispose don the second mounting base such that a relative position of the second light sensing device to the second mounting base is fixed. The second optical sensing module is disposed at a second corner of the touch area such that the second alignment structure is aligned with a profile of the second corner, and the second light sensing device faces the touch area. The second light sensing device is used for generating a second signal relative to the touch. The touch and display processing module is connected in communication to the first light sensing device, the second light sensing device, and the displaying device. The touch and display processing module is used for receiving the first signal and the second signal and generating coordinates relative to the touch according to the first signal and the second signal. The touch and display processing module controls the displaying device to display the image according to the coordinates.

Compared with the prior art, the invention directly obtains the positioning effect of the optical sensing modules to the touch area by aligning the structures of the optical sensing modules with the profile of the touch area; that is, the position and orientation of the light sensing device relative to the touch area are disposed in predetermined parameters automatically. So the optical sensing module and the touch function of the touch display system can be used without any further calibration. Furthermore, the optical touch system of the invention can further includes a distance-measuring module connected in communication to the processing module, for measuring a distance between the first light sensing device and the second light sensing device and generating a distance signal relative to the distance. Then, the processing module can receive the distance signal to generate the coordinates according to the first signal, the second signal, and the distance signal. In other words, in such the case, the optical touch system is applicable to various touch areas with different sizes, which expands the application scope of the optical sensing module and the touch display system of the invention further, especially to projection displaying systems.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
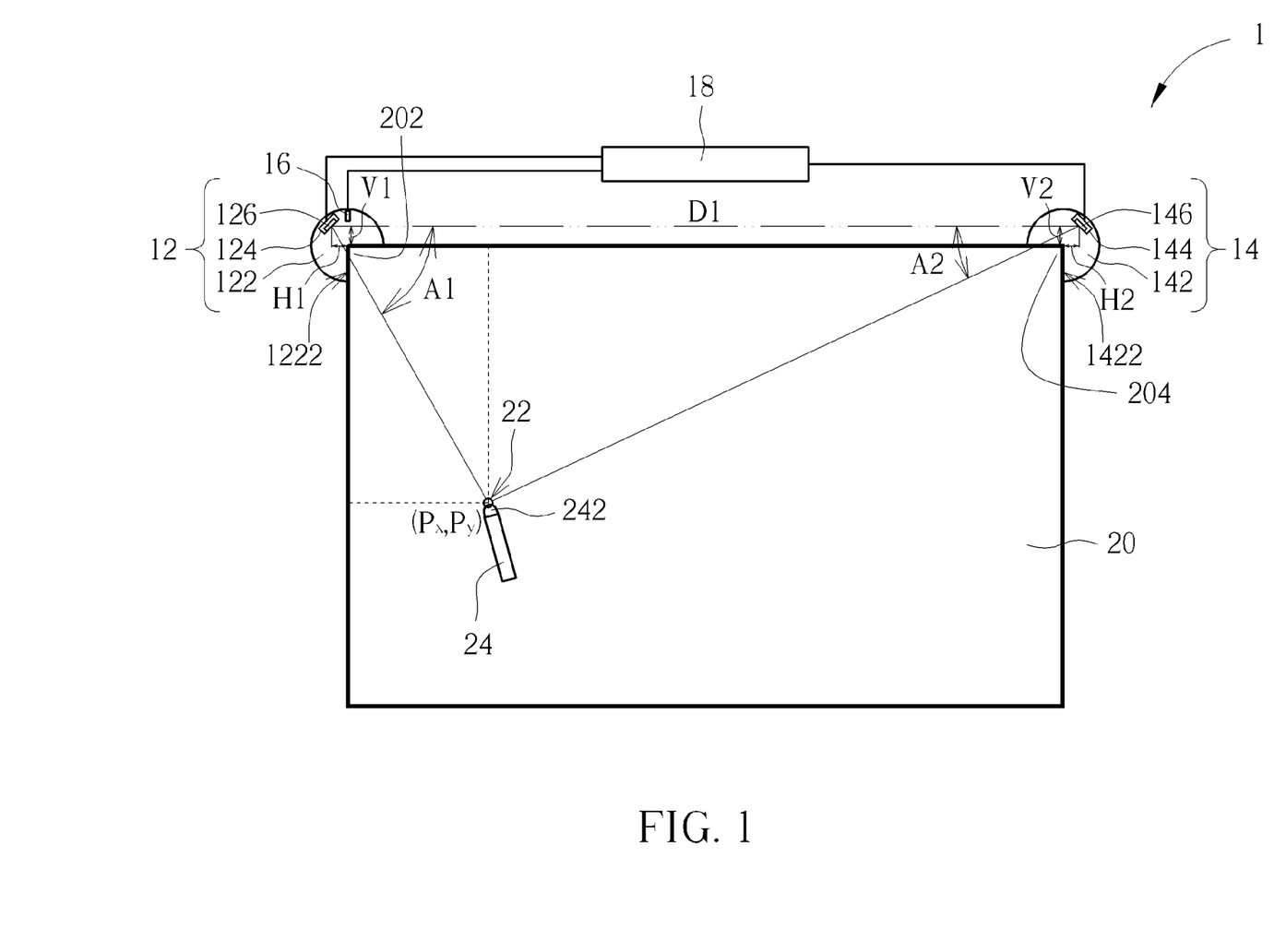
FIG. 1 is a schematic diagram illustrating an optical touch system of an embodiment according to the invention.
Figure 2:
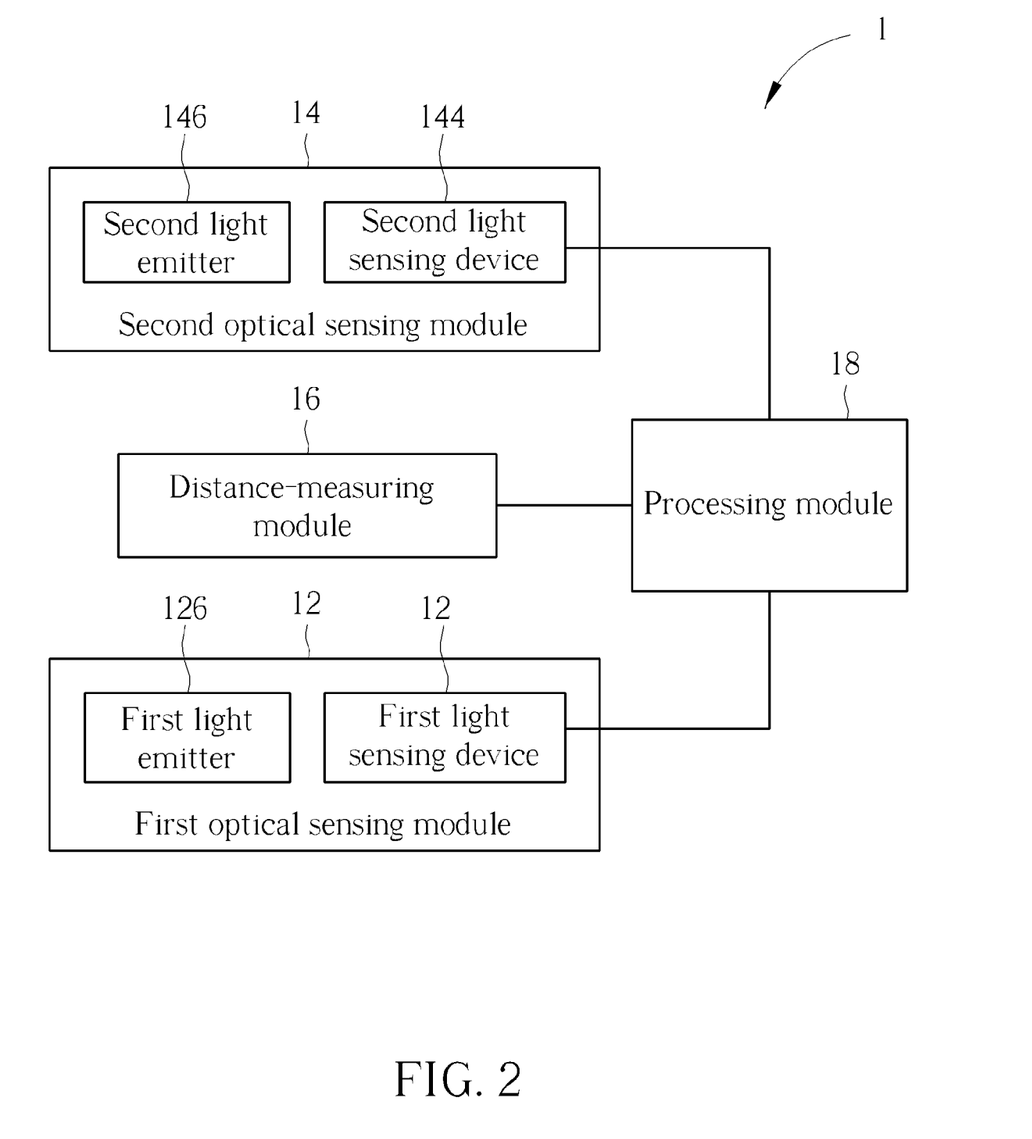
FIG. 2 is a function block diagram of the optical touch system in FIG. 1.
Figure 3:
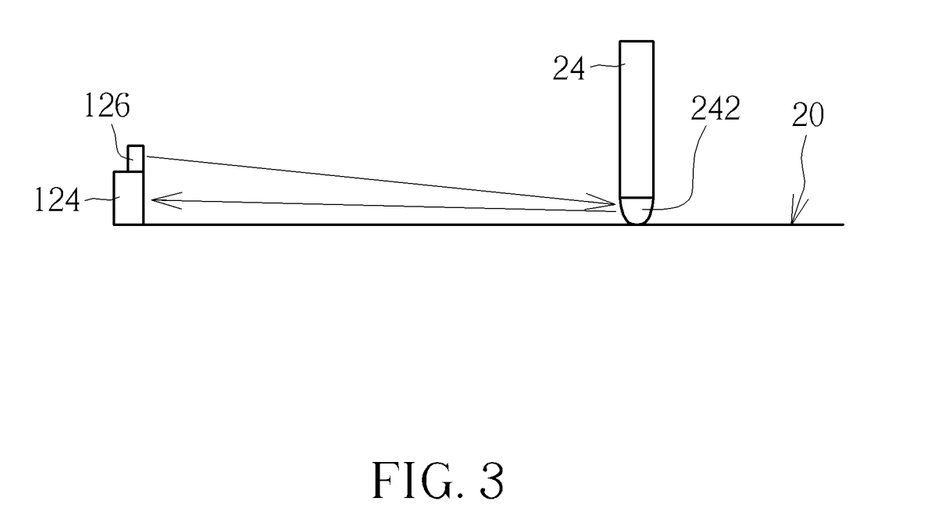
FIG. 3 is a schematic diagram illustrating a touch object of the optical touch system in FIG. 1 generates a touch.

Please refer to FIG. 1 and FIG. 2. FIG. 1 is a schematic diagram illustrating an optical touch system 1 of an embodiment according to the invention. FIG. 2 is a function block diagram of the optical touch system 1. The optical touch system 1 is used for sensing a touch 22 (shown by a small circle) performed on a touch area 20 (shown by a bold rectangular frame). The optical touch system 1 includes a first optical sensing module 12, a second optical sensing module 14, a distance-measuring module 16, and a processing module 18. The first optical sensing module 12 includes a first mounting base 122, a first light sensing device 124, and a first light emitter 126. The first mounting base 122 has a first alignment structure 1222. In the embodiment, the profile of a first corner 202 of the touch area 20 is a rectangular profile. The first alignment structure 1222 is a rectangular breach structure so that the first mounting base 122 has a three-fourths profile in whole. The rectangular breach structure matches with the rectangular profile so that the first mounting base 122 can be disposed closely at the first corner 202, but the invention is not limited thereto. The first light sensing device 124 is fixedly disposed on the first mounting base 122. The first light emitter 126 is disposed on the first mounting base 122 adjacent to the first light sensing device 124. In the embodiment, the first light emitter 126 is stacked directly on the first light sensing device 124, but the invention is not limited thereto. The first optical sensing module 12 is disposed at the first corner 202 such that the first alignment structure 1222 is aligned with the profile of the first corner 202, and the first light sensing device 124 faces the touch area 20. In other words, the first optical sensing module 12 is disposed at the first corner 202 by aligning the first alignment structure 1222 with the profile of the first corner 202 of the touch area 20. Because the relative position and orientation of the first light sensing device 124 to the first mounting base 122 is fixed, and the relative position and orientation of the first mounting base 122 to the first corner 202 is also fixed, the relative position and orientation of the first light sensing device 124 to the touch area 20 are disposed in predetermined parameters automatically (i.e. depending on the first alignment structure 1222 and the profile of the first corner 202). In other words, the disposition situation of the first light sensing device 124 relative to the touch area 20 is known. In principle, the first light sensing device 124 is ready for use without any further calibration. The first light emitter 126 emits light toward the touch area 20. The first light sensing device 124 receives the light reflected from the touch area 20 to generate a first signal S1 relative to the touch 22. In practice, the touch 22 can be performed by a touch object 24, such as a touch pen as shown by FIG. 3. The touch object 24 has a reflection area 242 for reflecting the light emitted by the first light emitter 126. Then the first light sensing device 124 can receive the reflected light to generate the first signal S1.

Similarly, the second optical sensing module 14 includes a second mounting base 142, a second light sensing device 144, and a second light emitter 146. The second mounting base 142 has a second alignment structure 1422. In the embodiment, the profile of a second corner 204 of the touch area 20 is a rectangular profile. The second alignment structure 1422 is a rectangular breach structure so that the second mounting base 142 has a three-fourths profile in whole. The rectangular breach structure matches with the rectangular profile, so that the second mounting base 142 can be disposed closely at the second corner 204, but the invention is not limited thereto. The second light sensing device 144 is fixedly disposed on the second mounting base 142. The second light emitter 146 is disposed on the second mounting base 142 adjacent to the second light sensing device 144. In the embodiment, the second light emitter 146 is stacked directly on the second light sensing device 144, but the invention is not limited thereto. The second optical sensing module 14 is disposed at the second corner 204 such that the second alignment structure 1422 is aligned with the profile of the second corner 204, and the second light sensing device 144 faces the touch area 20. In other words, the second optical sensing module 14 is disposed at the second corner 204 by aligning the second alignment structure 1422 with the profile of the second corner 204 of the touch area 20. Because the relative position and orientation of the second light sensing device 144 to the second mounting base 142 is fixed, and the relative position and orientation of the second mounting base 142 to the second corner 204 is also fixed, the relative position and orientation of the second light sensing device 144 to the touch area 20 are disposed in predetermined parameters automatically (i.e. depending on the second alignment structure 1422 and the profile of the second corner 204). In other words, the disposition situation of the second light sensing device 144 relative to the touch area 20 is known. In principle, the second light sensing device 144 is ready for use without any further calibration. The second light emitter 146 emits light toward the touch area 20. The second light sensing device 144 receives the light reflected from the touch area 20 to generate a second signal S2 relative to the touch 22.

The distance-measuring module 16 is used for measuring a distance D1 between the first light sensing device 124 and the second light sensing device 144 and generating a distance signal S3 relative to the distance D1; that is, the distance signal S3 includes information about the distance D1. In the embodiment, the distance-measuring module 16 generates the distance signal S3 by use of wireless distance measurement, but the invention is not limited thereto.

The processing module 18 is connected in communication to the first light sensing device 124, the second light sensing device 144, and the distance-measuring module 16 respectively. In practice, the processing module 18 can be connected in communication by a wire or wireless connection to the first light sensing device 124, the second light sensing device 144, and the distance-measuring module 16. In addition, the processing module 18 also can be integrated into the first optical sensing module 12, the second optical sensing module 14, or the distance-measuring module 16, which will not be described herein. The processing module 18 is used for receiving the first signal S1, the second signal S2, and the distance signal S3 and generating coordinates (Px,Py) relative to the touch 22 according to the first signal S1, the second signal S2, and the distance signal S3.

Figure 4:
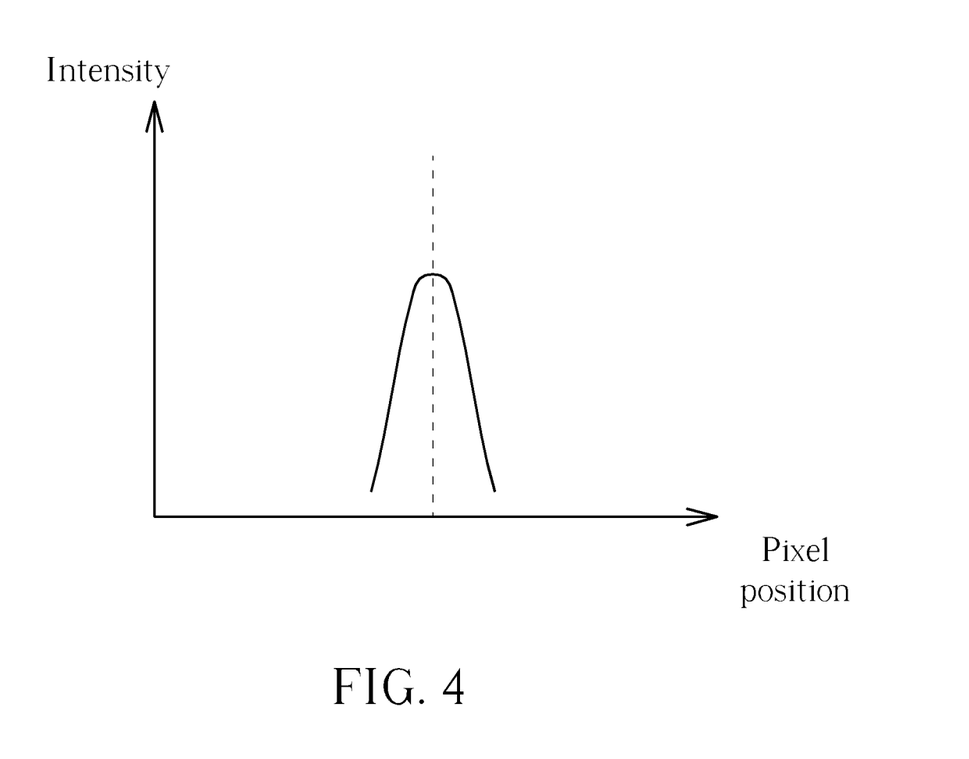
FIG. 4 is a schematic diagram illustrating an intensity distribution of reflected light sensed by a first light sensing device or a second light sensing device of the optical touch system in FIG. 1.

Please refer to FIG. 1 and FIG. 4. FIG. 4 is a schematic diagram illustrating an intensity distribution of reflected light sensed by the first light sensing device 124 or the second light sensing device 144. In practice, the first light sensing device 124 and the second light sensing device 144 can be implemented by CCD or CMOS; therefore, the first light sensing device 124 and the second light sensing device 144 can be regarded as image-capturing components. An image captured by the image-capturing component can be set to an image consisting of one or two rows pixels. As shown by FIG. 4, the image captured by the first light sensing device 124 or the second light sensing device 144 can be presented by the light intensity distribution, i.e. a touch signal correspondingly. Therein, the abscissa presents positions of the pixels of the captured image; the ordinate presents intensities (i.e. light intensities) of the pixels of the captured image. In practice, an average of the positions at the left boundary and the right boundary is regarded as the current position of the touch. Because the relative positions and orientations of the first light sensing device 124 and the second light sensing device 144 are fixed and predetermined, the pixel positions of the captured image can correspond to angles of the touch relative to the first light sensing device 124 and the second light sensing device 144. In practice, the relation between the pixel positions and the corresponding angles can be presented in form of a table (partial content being showed in the following). The angle corresponding to the occurrence position (i.e. pixel position) of the touch can be found out by mapping the table. In the table, the corresponding angles are presented by their tangents, which is conducive to the calculation for the coordinates (Px,Py) relative to the touch 22, but the invention is not limited thereto.

TABLE

| pixel positions | tangents of corresponding angles |
| --- | --- |
| 494 | 2.285714 |
| 495 | 2.380952 |
| 496 | 2.47619 |
| 497 | 2.571429 |
| 498 | 2.666667 |
| 499 | 2.761905 |
| 500 | 2.857143 |

In practice, the dispositions for the light sensing devices 124 and 144 may be influenced by its view so that the light sensing devices 124 and 144 are required to be shifted from the touch area 20 in a small distance so as to receive all light from the touch area 20. As shown by FIG. 1, the first light sensing device 124 and the second light sensing device 144 are not exactly disposed at the apexes of the corners 202 and 204, but shifted from the touch area 20 to be disposed. The first light sensing device 124 has a horizontal offset H1 and a vertical offset V1 relative to the first corner 202; the second light sensing device 144 has a horizontal offset H2 and a vertical offset V2 relative to the second corner 204. For simple description, the horizontal offset H1 and the vertical offset V1 are equal to the horizontal offset H2 and the vertical offset V2 respectively. Angles A1 and A2 of the touch 22 relative to the first light sensing device 124 and the second light sensing device 144 can be determined by mapping the above table according to images captured by the first light sensing device 124 and the second light sensing device 144 respectively. The signals S1 and S2 including information of the angles A1 and A2 are sent to the processing module 18. Based on trigonometric relations, the coordinates (Px,Py) relative to the touch 22 can be calculated. Therein, the coordinate origin is defined at the apex of the first corner 202, the positive direction of the coordinate Px is rightward, and the positive direction of the coordinate Py is downward. The calculation formulae are shown below:

$$Px = \frac{D1 \times \tan A1}{\tan A1 + \tan A2} - H1$$
$$Py = Px \times \tan A1 - V1$$

After the processing module 18 received the signals S1, S2 and S3, the angles A1 and A2 and the distance D1 can be obtained by analyzing the signals S1, S2 and S3, so that the coordinates (Px,Py) relative to the touch 22 can be obtained according to the above calculation formulae. Further, the processing module 18 can send the coordinates (Px,Py) by a wire or wireless connection to other devices, e.g. a projection system. The projection system can project an image on the touch area 20 according to the coordinates (Px,Py). The image can include an indication mark, e.g. mouse cursor.

It is added that in an actual application of the optical touch system 1, the first optical sensing module 12 and the second optical sensing module 14 are disposed in a detachable method at the corners 202 and 204 of the touch area 20, so the first optical sensing module 12 and the second optical sensing module 14 are not limited to be fixed permanently. In practice, the optical touch system 1 can be integrated with a displaying system so as to be a touch display system. Therein, the alignments of the first alignment structure 1222 and the second alignment structure 1422 with the first corner 202 and the second corner 204 respectively are not limited to connections of physical structures and can be performed by aligning the edges of image-displaying area (e.g. projection displaying area) by bare eyes. Furthermore, the optical touch system 1 equipped with the distance-measuring module 16 allows the distance between the first light sensing device 124 and the second light sensing device 144 to vary, so the optical touch system 1 is applicable to various touch areas with different sizes in working with various displaying area with different sizes especially projected by a projector.

Figure 5:
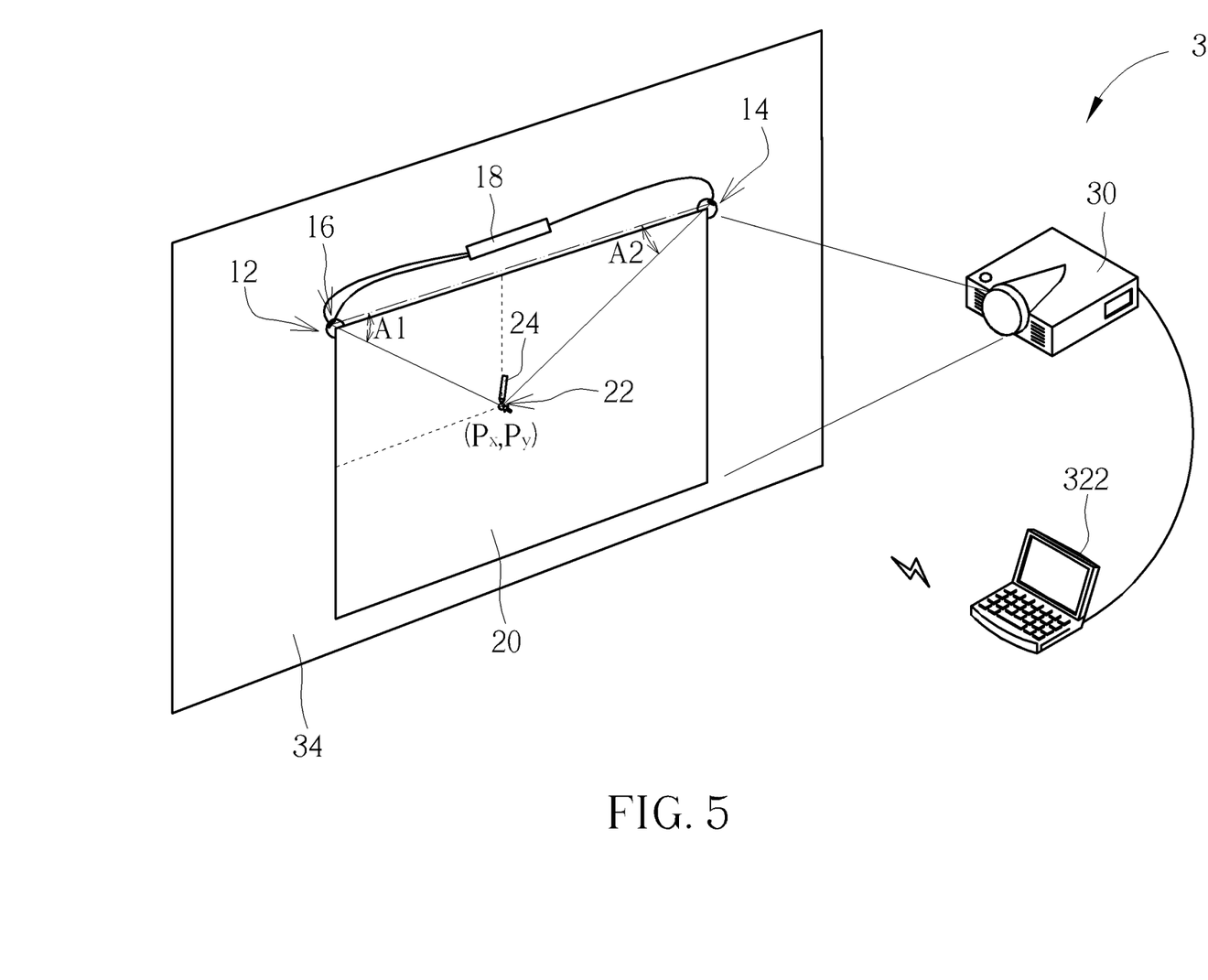
FIG. 5 is a schematic diagram illustrating a touch display system of an embodiment according to the invention.
Figure 6:
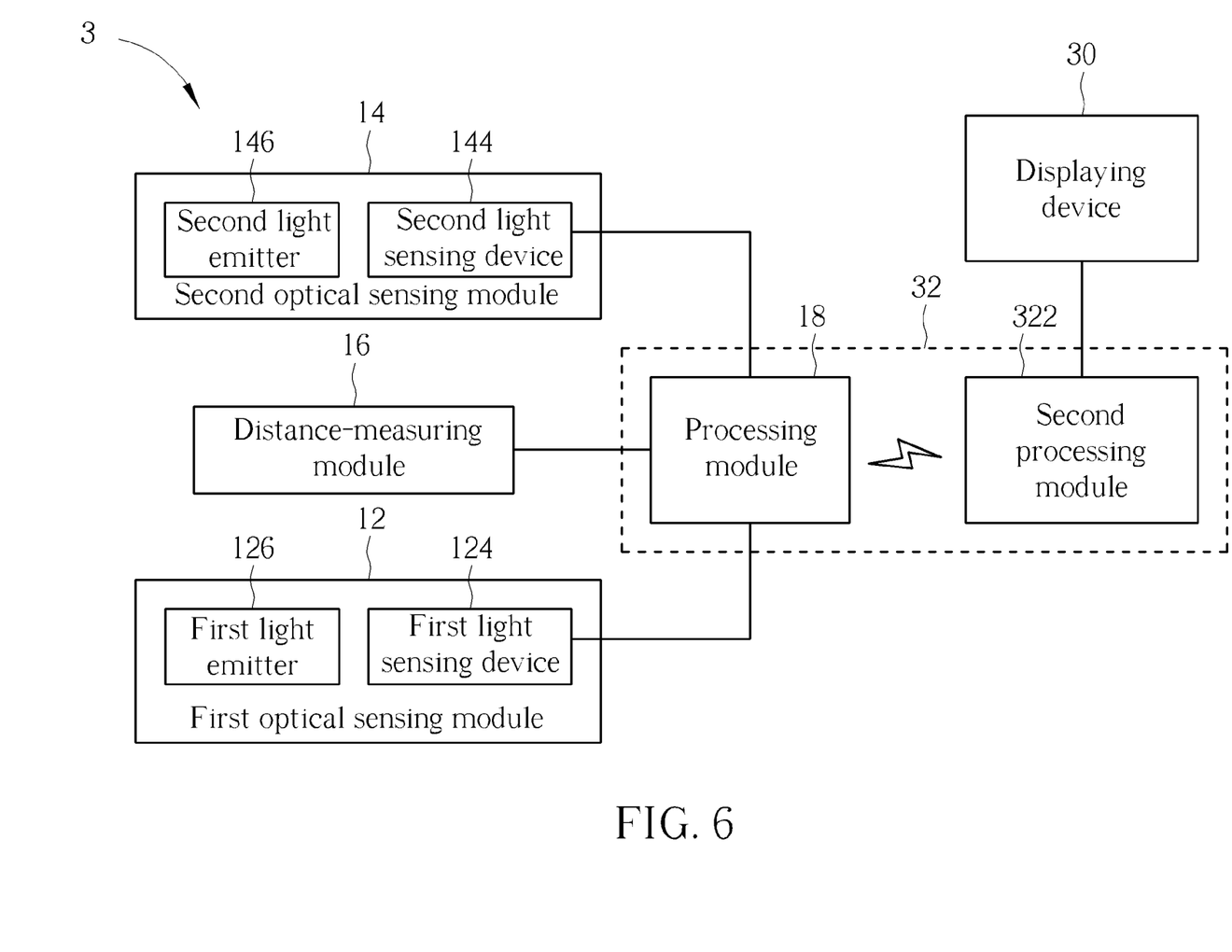
FIG. 6 is a function block diagram of the touch display system in FIG. 5.

Please refer to FIGS. 1, 5 and 6. FIG. 5 is a schematic diagram illustrating a touch display system 3 of an embodiment according to the invention. FIG. 6 is a function block diagram of the touch display system 3. The touch display system 3 includes the first optical sensing module 12, the second optical sensing module 14, the distance-measuring module 16, a displaying device 30, and a touch and display processing module 32. The touch and display processing module 32 includes a first processing module (i.e. the processing module 18) and a second processing module 322. Therein, the first optical sensing module 12, the second optical sensing module 14, the distance-measuring module 16, and the processing module 18 are the foregoing optical touch system 1. Therefore, in logic, the touch display system 3 can be regarded as a combination of the optical touch system 1 and a displaying system. For other description of the optical touch system 1, please refer to the above relevant description directly, which will not be described in addition.

In the embodiment, the displaying device 30 includes a projector for projecting an image on a screen 34 (e.g. a wall surface or projection screen). The screen 34 thereon defines the touch area 20. In principle, the touch area 20 is substantially equal to the image-displaying area, but the invention is not limited thereto. In a practical use, when the displaying device 30 projects, the edges of the image-displaying area are clear, so that a user can easily align the first alignment structure 1222 of the first mounting base 122 with the profile of the first corner 202 of the touch area 20 (by recognizing the edges of the corner of the image-displaying area) so as to complete the disposition of the first optical sensing module 12. In other words, the first optical sensing module 12 can also be precisely located without connection of physical structures. The disposition of the second optical sensing module 14 is similar and will not be described in addition. The second processing module 322 is connected in communication to the displaying device 30 to control the displaying device 30 to project images. The processing module 18 is connected in communication to the second processing module 322 so that the second processing module 322 can receive the coordinates (Px,Py) generated by the processing module 18 from the processing module 18 and control the displaying device 30 to project an image according to the coordinates (Px,Py). In an example, the image includes an indication mark (e.g. mouse cursor). The position where the indication mark is displayed corresponds to the coordinates (Px,Py). In another example, the second processing module 322 responds to a touch operation (including the touch 22) to plane move the displayed image according to the coordinates (Px,Py).

It is added that in the embodiment, the second processing module 322 is realized by a notebook. Therefore, the processing module 18 and the second processing module 322 are connected by a wireless connection in principle. The displaying device 30 and the second processing module 322 can be connected by a wire or wireless connection. However, the invention is not limited thereto. For example, the processing module 18 can be integrated into the notebook; that is, the notebook implements the touch and display processing module 32. The first optical sensing module 12, the second optical sensing module 14, and the distance-measuring module 16 are connected by wireless connections to the notebook (i.e. the touch and display processing module 32). The touch and display processing module 32 receives the first signal S1, the second signal S2, and the distance signal S3 and generates the coordinates according to the first signal S1, the second signal S2, and the distance signal S3. The touch and display processing module 32 can control the displaying device 30 to display the image according to the coordinates (Px,Py) without sending the coordinates (Px,Py) through a wire medium (e.g. cable) or a wireless medium (e.g. radio).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch system for sensing a touch performed on a touch area, comprising:

a first optical sensing module, the first optical sensing module comprising a first mounting base and a first light sensing device, the first mounting base having a first alignment structure, the first alignment structure having two first non-parallel structural edges, the first light sensing device being disposed on the first mounting base, the first optical sensing module being disposed at a first corner of the touch area such that the first alignment structure is aligned with a profile of the first corner so that the two first non-parallel structural edges contact two adjacent edges of the profile of the first corner in parallel respectively, and the first light sensing device faces the touch area, the first light sensing device being used for generating a first signal relative to the touch, the first light sensing device being shifted from the first corner by a first vertical offset and a first horizontal offset;

a second optical sensing module, the second optical sensing module comprising a second mounting base and a second light sensing device, the second mounting base having a second alignment structure, the second alignment structure having two second non-parallel structural edges, the second light sensing device being disposed on the second mounting base, the second optical sensing module being disposed at a second corner of the touch area such that the second alignment structure is aligned with a profile of the second corner so that the two second non-parallel structural edges contact two adjacent edges of the profile of the second corner in parallel respectively, and the second light sensing device faces the touch area, the second light sensing device being used for generating a second signal relative to the touch, the second light sensing device being shifted from the second corner by a second vertical offset and a second horizontal offset, the two adjacent edges of the profile of the first corner and the two adjacent edges of the profile of the second corner being coplanar; and a processing module connected in communication to the first light sensing device and the second light sensing device, for receiving the first signal and the second signal and generating coordinates relative to the touch according to the first signal, the second signal, the first vertical offset, the first horizontal offset, the second vertical offset, the second horizontal offset, and a distance between the first light sensing device and the second light sensing device.

2. The optical touch system of claim 1, wherein the profile of the first corner is a rectangular profile, the first alignment structure is a rectangular breach structure, and the rectangular breach structure matches with the rectangular profile.

3. The optical touch system of claim 1, further comprising a distance-measuring module for measuring the distance between the first light sensing device and the second light sensing device and generating a distance signal relative to the distance, the processing module being connected in communication to the distance-measuring module and receiving the distance signal to generate the coordinates according to the first signal, the second signal, the first vertical offset, the first horizontal offset, the second vertical offset, the second horizontal offset, and the distance signal.

4. The optical touch system of claim 3, wherein the distance-measuring module generates the distance signal by use of wireless distance measurement.

5. The optical touch system of claim 1, wherein the first optical sensing module further comprises a light emitter disposed adjacent to the first light sensing device for emitting light toward the touch area, and the first light sensing device receives the light reflected from the touch area to generate the first signal.

6. The optical touch system of claim 5, further comprising a touch object for performing the touch on the touch area, the touch object having a reflection area for reflecting the light emitted from the light emitter.

7. A touch display system, comprising:
a displaying device for displaying an image on a screen, the screen thereon defining a touch area;
a first optical sensing module, the first optical sensing module comprising a first mounting base and a first light sensing device, the first mounting base having a first alignment structure, the first alignment structure having two first non-parallel structural edges, the first light sensing device being disposed on the first mounting base, the first optical sensing module being disposed at a first corner of the touch area such that the first alignment structure is aligned with a profile of the first corner so that the two first non-parallel structural edges contact two adjacent edges of the profile of the first corner in parallel respectively, and the first light sensing device faces the touch area, the first light sensing device being used for generating a first signal relative to a touch performed on the touch area, the first light sensing device being shifted from the first corner by a first vertical offset and a first horizontal offset;
a second optical sensing module, the second optical sensing module comprising a second mounting base and a second light sensing device, the second mounting base having a second alignment structure, the second alignment structure having two second non-parallel structural edges, the second light sensing device being disposed on the second mounting base, the second optical sensing module being disposed at a second corner of the touch area such that the second alignment structure is aligned with a profile of the second corner so that the two second non-parallel structural edges contact two adjacent edges of the profile of the second corner in parallel respectively, and the second light sensing device faces the touch area, the second light sensing device being used for generating a second signal relative to the touch, the second light sensing device being shifted from the second corner by a second vertical offset and a second horizontal offset, the two adjacent edges of the profile of the first corner and the two adjacent edges of the profile of the second corner being coplanar; and
a touch and display processing module connected in communication to the first light sensing device, the second light sensing device, and the displaying device for receiving the first signal and the second signal and generating coordinates relative to the touch according to the first signal, the second signal, the first vertical offset, the first horizontal offset, the second vertical offset, the second horizontal offset, and a distance between the first light sensing device and the second light sensing device, the touch and display processing module controlling the displaying device to display the image according to the coordinates.

8. The touch display system of claim 7, wherein the displaying device comprises a projector for projecting the image on the screen.

9. The touch display system of claim 7, wherein the image comprises an indication mark, and the indication mark corresponds to the coordinates.

10. The touch display system of claim 7, wherein the profile of the first corner is a rectangular profile, the first alignment structure is a rectangular breach structure, and the rectangular breach structure matches with the rectangular profile.

11. The touch display system of claim 7, further comprising a distance-measuring module for measuring the distance between the first light sensing device and the second light sensing device and generating a distance signal relative to the distance, the touch and display processing module being connected in communication to the distance-measuring module and receiving the distance signal to generate the coordinates according to the first signal, the second signal, the first vertical offset, the first horizontal offset, the second vertical offset, the second horizontal offset, and the distance signal.

12. The touch display system of claim 11, wherein the distance-measuring module generates the distance signal by use of wireless distance measurement.

13. The touch display system of claim 11, wherein the touch and display processing module comprises a first processing module and a second processing module, the first processing module is connected in communication to the second processing module, the first processing module is used for received the first signal, the second signal, and the distance signal and generating the coordinates according to the first signal, the second signal, and the distance signal, and the second processing module receives the coordinates from the first processing module to control the displaying device to display the image.

14. The touch display system of claim 7, wherein the first optical sensing module further comprises a light emitter disposed adjacent to the first light sensing device for emitting light toward the touch area, and the first light sensing device receives the light reflected from the touch area to generate the first signal.

15. The touch display system of claim 14, further comprising a touch object for performing the touch on the touch area, the touch object having a reflection area for reflecting the light emitted from the light emitter.

* * * * *